United States Patent [19]

Kelly

[11] Patent Number: 5,537,915
[45] Date of Patent: Jul. 23, 1996

[54] FOODSTUFF DISPENSING MACHINE

[75] Inventor: Edward C. Kelly, Blue Bell, Pa.

[73] Assignee: Premier Design, Ltd., Warminster, Pa.

[21] Appl. No.: 291,308

[22] Filed: Aug. 16, 1994

[51] Int. Cl.$^6$ ............... A47J 31/00; A47J 37/12
[52] U.S. Cl. ............... 99/336; 99/357; 99/407
[58] Field of Search ............... 99/334, 336, 330, 99/335, 352–356, 357, 403–408, 443 C, 536, 483; 426/231, 429–431, 441, 438, 509, 512, 513, 518, 516; 222/372; 221/150 R, 150 A, 150 HC

[56] References Cited

U.S. PATENT DOCUMENTS

| | | | |
|---|---|---|---|
| 2,653,733 | 9/1953 | Rudd et al. | 222/145 |
| 2,698,702 | 1/1955 | Ahlstrom | 222/145 |
| 3,357,341 | 12/1967 | Kocken et al. | 99/334 |
| 3,550,814 | 12/1970 | von Lersner | 222/145 |
| 3,818,820 | 6/1974 | Harris et al. | 99/407 |
| 4,428,280 | 1/1984 | Williams et al. | 99/356 |
| 4,438,683 | 3/1984 | Bartfield | 99/330 |
| 4,474,310 | 10/1984 | Müller et al. | 222/145 |
| 4,540,588 | 9/1985 | Bartfield | 426/231 |
| 4,646,627 | 3/1987 | Bartfield et al. | 99/330 |
| 4,722,267 | 2/1988 | Galockin et al. | 99/357 |
| 5,003,868 | 4/1991 | Higgins et al. | 99/357 |
| 5,165,329 | 11/1992 | Jacob et al. | 99/336 |
| 5,174,470 | 12/1992 | North et al. | 221/150 HC |
| 5,197,376 | 3/1993 | Bird et al. | 99/330 |
| 5,205,206 | 4/1993 | Kitama et al. | 99/326 |

*Primary Examiner*—Timothy F. Simone
*Attorney, Agent, or Firm*—Panitch Schwarze Jacobs & Nadel

[57] ABSTRACT

A foodstuff vending machine has a vending housing includes a processing container for containing and processing of a foodstuff. A receiving basket is provided for receiving the foodstuff from the processing container. A dispensing mechanism is provided for dispensing the received foodstuff. The receiving basket has an operable surface with a closed position for preventing the received foodstuff from passing therethrough. The receiving basket also has an open position for permitting the received foodstuff to pass through to the dispensing mechanism. The receiving basket also has an opening device for opening the operable surface. The opening device is operable to open the operable surface upon contact with the dispensing mechanism.

25 Claims, 7 Drawing Sheets

FOODSTUFF DISPENSING MACHINE

BACKGROUND OF THE INVENTION

The present invention relates to the field of vending machines and, more particularly by, to the field of vending machines for dispensing freshly cooked foodstuff.

Food preparation devices are well known in the prior art. More particularly, prior art devices for storing and mixing dry foodstuff and water are known. For example, it is known to make cookies by storing wheat flour and water and providing them to a stirring and mixing device for processing. This apparatus also included a shaping device for forming the mixture obtained by the stirring and mixing device into a predetermined shape by extruding it through extrusion holes. Thereafter the shaped mixture was collected and baked by an oven which was separate from the blending and forming devices.

Additionally, a prior art apparatus is known for preparing cooked foods such as fried potatoes. This apparatus sliced the potatoes to form potato slices. The potato slices were then fried by carrying them on a conveyor through a storage bath for storing edible oil which had been previously heated to a predetermined temperature. This prior art apparatus was adapted to process perishable foods such as potatoes. Thus, when it was not operated for a prolonged period of time, the freshness of the potatoes was lowered. This resulted in a degrading of the quality of produced foods.

Other machines are known in the prior art for dispensing perishable foods. For instance, such machines are described in U.S. Pat. No. 3,488,677, U.S. Pat. No. 3,690,247 and U.S. Pat. No. 3,818,820. A problem with machines of the type described in these patents was the relatively rapid deterioration of the raw materials used to make the dispensed product and the relatively limited raw materials storage capacity of the machines. Thus a method for providing fried food without storing perishable food was preferred.

U.S. Pat. No. 3,622,355 describes a dry food product and a process for making a food product that was reconstituted. This eliminated many of the problems associated with the storage of perishable food in the prior art. In the reconstitution method the dry product was agitated and formed into a uniform dough. French-fry-cut potato pieces, for example, were formed from the dough. Devices which could perform this forming operation are described in U.S. Pat. No. 3,605,647, U.S. Pat. No. 3,764,345, U.S. Pat. No. 3,771,937, U.S. Pat. No. 3,782,969, U.S. Pat. No. 3,789,750 and U.S. Pat. No. 3,890,453.

U.S. Pat. No. 4,438,683 disclosed a storage hopper for storing a supply of food product to be dispensed in a dehydrated form. A supply device was provided for transferring a predetermined amount of the dehydrated food product corresponding to the size of an individual order to a rehydrating chamber. Liquid was then dispensed to the dehydrated food product in the chamber to reconstitute the food product. A piston forced the reconstituted product through a die positioned within the outlet of the rehydrating chamber. A cutting device was provided adjacent the outlet of the die to sever individual pieces of rehydrated foodstuff forced through the die by the piston.

The individual severed pieces fell into a heated container of heating or cooking oil disposed beneath the rehydrating chamber. A conveyor carried the cooked food product to an outlet of the apparatus. The cooking and dispensing sequence was initiated by a coin operated actuating mechanism. A partial dispensing sequence was initiated after a predetermined lapse of time following the preceding dispensing operation. The remaining reconstituted food products were then transferred through a storage bath in order to cook them. The transfer path of this apparatus was required to be relatively long in order to sufficiently heat the slices. As a result the apparatus was large in size.

Furthermore, in this prior art apparatus when a small amount of the food mixture was extruded the mixture stuck to the inner surface of a casing which formed the mixing chamber. This resulted in a low yield. When a large amount of a mixture was extruded, the extruded mixture tended to rot unless all portions of the extruded mixture were immediately processed.

U.S. Pat. No. 5,165,329 discloses another method of french frying a food product. In this method a basket containing the food product to be french fried was adapted to occupy either a lowered position in which the basket was immersed in a deep fat bath, or an elevated position in which the basket was maintained above the bath. A motor was provided for lowering and raising the basket to dispose it in these two positions.

In other known deep fat fryers of this type, the basket was lowered from its raised position to its lowered position when the temperature of the cooking bath attained a suitable temperature. A mechanical timer then started counting down until the end of the cooking period. At the end of the cooking period the basket was raised to its elevated position. In order to carry out this cycle these deep fat fryers were provided with a fairly complex control device adapted to selectively control a number of independent motors.

U.S. Pat. No. 5,165,329 taught lowering and raising the basket and driving the mechanical timer with a single motor. The single motor was controlled by the position of the basket. In this manner the motor drove the timer when the basket occupied its lowered position and otherwise it drove the means for lowering and raising the basket.

U.S. Pat. No. 4,646,627 taught an apparatus for preparing and dispensing individual portions of a fried potato product prepared from dehydrated potatoes that were rehydrated immediately prior to frying and dispensing. The output of this device was a product that resembled french fried potatoes that have been prepared by frying cut raw potatoes. The apparatus included means for storing individual bags of dehydrated product that were opened as necessary depending upon the demand for the product. The empty bags were retained within the device for subsequent removal. A bag cutting device opened the bags permitting the product to fall into a product hopper. A product forming section was provided to reconstitute a measured portion of the dehydrated material and provide a dough that was formed into the desired shape. The shaped dough was fried in a fryer that contained hot frying oil. The fried product was then removed from the fryer and transported to a dispensing station where it was dispensed into a serving container.

Residue that remained in the dough forming portion of the apparatus was dried by means of heat in order to minimize the likelihood of biological contamination. Furthermore, the oil used for cooking the shaped dough was maintained in a closed system at an elevated temperature and periodically recycled through the cooking bath. This permitted the apparatus to maintain the cooking bath at an elevated temperature and ready for immediate operation. It therefore eliminated the need for a time consuming heating operation when an order was prepared and dispensed and permitted immediate cooking of the dough after it was formed. U.S. Pat. No.

3,818,820 taught a frying basket which was moveable from an upright position in a frying bath to an at least a partly inverted position outside the cooking bath. Also disclosed in this reference was means for ejecting a portion of food from the hopper into the basket when the basket was in a position between its upright position and its partly inverted position. The degree of movement required by the basket was the amount necessary to cause all of the fried edible products in the frying basket to move from the frying basket under the influence of gravity.

The frying basket was slidably mounted in such a way that when the basket was partially inverted it slid under the influence of gravity until brought to rest by a stop member. This ensured that when the basket was inverted, all the fried food product contained therein was ejected by the jerk of the basket when it stopped. Means were also provided to stop the sliding of the basket until the inverting thereof reached a required extent.

The means for feeding food from the hopper into the basket was a slidably mounted ejection scoop. The ejection scoop was movable between a position in which the scoop was under the food in the hopper to a position laterally outside the hopper. The size of the scoop was selected to cause the system to dispense a portion having a predetermined size.

Food to be fried and dispensed was fed from the hopper to the basket by way of a sliding ejector mechanism. The basket was then moved into the frying oil. After a predetermined time interval the basket was removed from the frying oil and moved to a position in which the fried food fell out of the basket and onto a plate placed suitably for the purpose by the user of the apparatus.

In U.S. Pat. No. 5,197,376 the dehydrated food material was stored in a reservoir. The reservoir had a large enough volume to eliminate the need for frequent replenishing of the food material. The food material was measured so that a precise amount was loaded into a holding cup. A controlled amount of the rehydrating liquid was added to the holding cup after the food material was loaded into it. The addition of the rehydrating liquid produced a rehydrated food material. The rehydrated food material was forced from the holding cup into a transporting device and, during the transporting process, cut into pieces having the desired sizes and shapes. The transporting device moved the pieces to a cooking area and dispensed them after cooking. While one group of food pieces was being cooked and dispensed by this device additional dehydrated food material was rehydrated and formed.

When dehydrated food material was used in the prior art it was known that the use of heated liquid provided improved rehydration. Heated liquid provided the fastest and most uniform rehydration. Therefore, many prior art devices included a hot water heater for heating the rehydration liquid before it was delivered to the rehydration stations where it was mixed with dehydrated food material. To maximize coverage of the food material with the hot water, the rehydration station of one prior art device included a rotating shower head with a number of spray nozzles.

It was also disclosed in the prior art that improved rehydration could be obtained when the dehydrated food material was placed in a compact level arrangement prior to the addition of the rehydrating liquid. In such an arrangement the dehydrated food material was formed into a uniform volume without peaks and valleys. Therefore, the piston that later forced the rehydrated material from the rehydration station was used to level and to compress the dehydrated food material prior to rehydration. During this leveling process the piston was lowered by a predetermined amount until contact was made between the piston and the dehydrated food material. The piston was then rotated to level the surface of the food material. The same piston was used both for leveling the dehydrated material in this manner and for forcing the material from the container after rehydration.

The present invention is a foodstuff vending machine having a processing container for receiving and processing a dehydrated foodstuff. When water is received into the processing container along with the dehydrated foodstuff pressure is applied and the dehydrated foodstuff is rehydrated. A receiving basket is then disposed beneath the processing container. A sealed extrusion die at the bottom of the processing container is unsealed and a piston drives the rehydrated foodstuff through the unsealed extrusion die to form an extruded food product. The receiving basket receives the extruded food product. The receiving basket is provided with an openable bottom surface which prevents foodstuff from passing therethrough when in its closed position and permits the foodstuff to pass therethrough when in its open position. An opening device is provided to move the operable surface from its closed position to its open position. A cooking chamber is also provided. The receiving basket transports the extruded rehydrated food product to the cooking chamber and is lowered into the cooking chamber where the foodstuff is cooked. A dehydrated foodstuff storage hopper is provided for storing the dehydrated food and a heated water container is provided for storing heated water.

SUMMARY OF THE INVENTION

Briefly stated, the invention comprises a foodstuff vending machine which has a vending housing and includes a processing container for containing and processing of foodstuff. A receiving basket is provided for receiving the foodstuff from the processing container. A dispensing mechanism is provided for dispensing the received foodstuff. The receiving basket has an operable surface with a closed position for preventing the received foodstuff from passing therethrough. The receiving basket also has an open position for permitting the received foodstuff to pass through to the dispensing mechanism. The receiving basket also has an opening device for opening the operable surface. The opening device is operable to open the operable surface upon contact with the dispensing mechanism.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
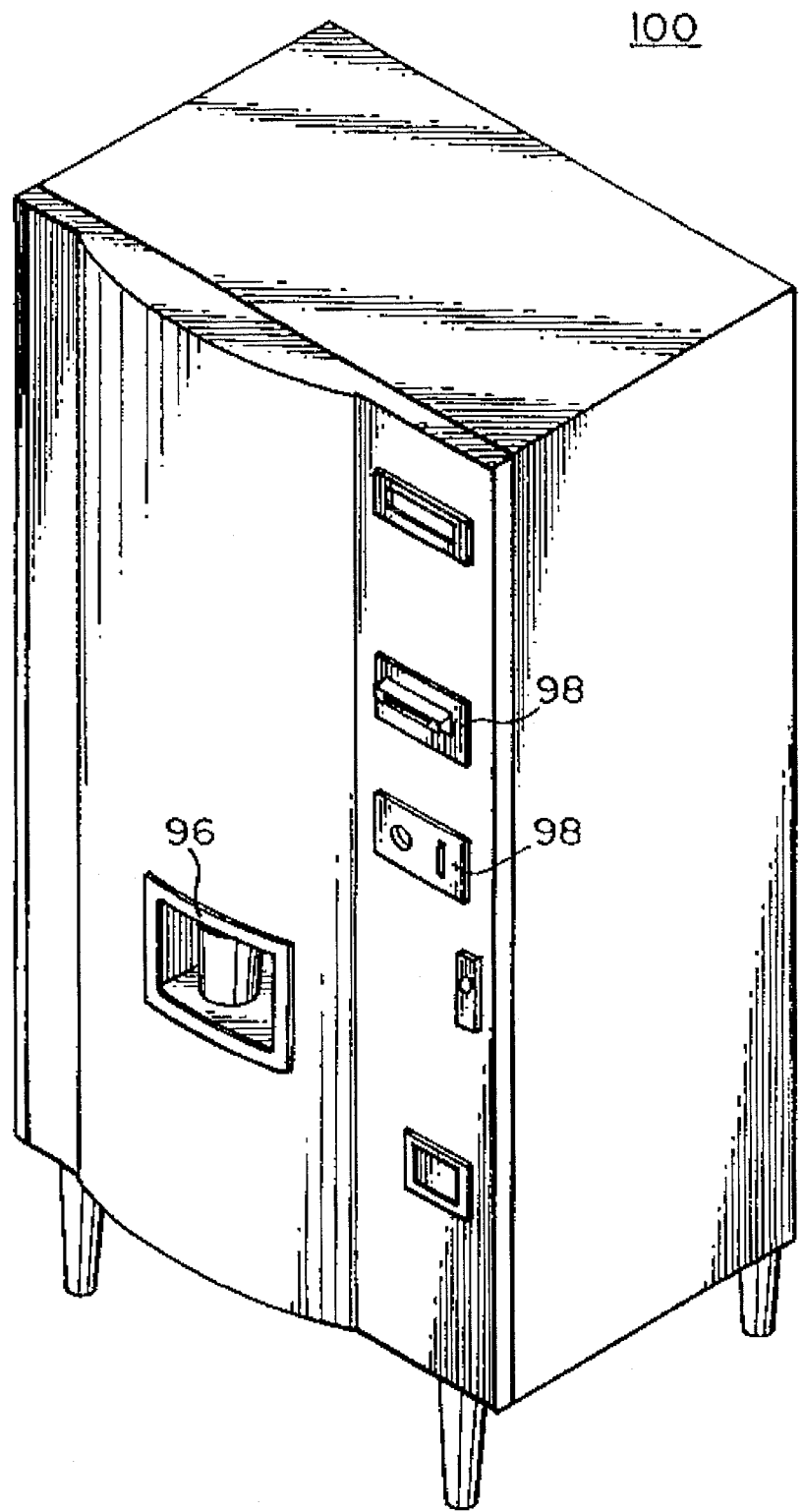
FIG. 1 is a perspective view of a preferred embodiment of a machine for dispensing individually prepared servings of french fries in accordance with the present invention.

Referring to the drawings, wherein the same numerals are used to indicate like elements throughout, there is shown in FIG. 1, a front view of a preferred embodiment of a vending machine for dispensing individually prepared servings of foodstuffs in accordance with the present invention, referred to generally as the foodstuff dispensing machine 100. The foodstuff dispensing machine 100 is a vending machine which receives payment from a user by way of slots 98 to initiate a vend cycle and provides an individual serving of a hot french fried foodstuff, such as french fried potatoes, at opening 96 during each vend cycle.

Figure 2:
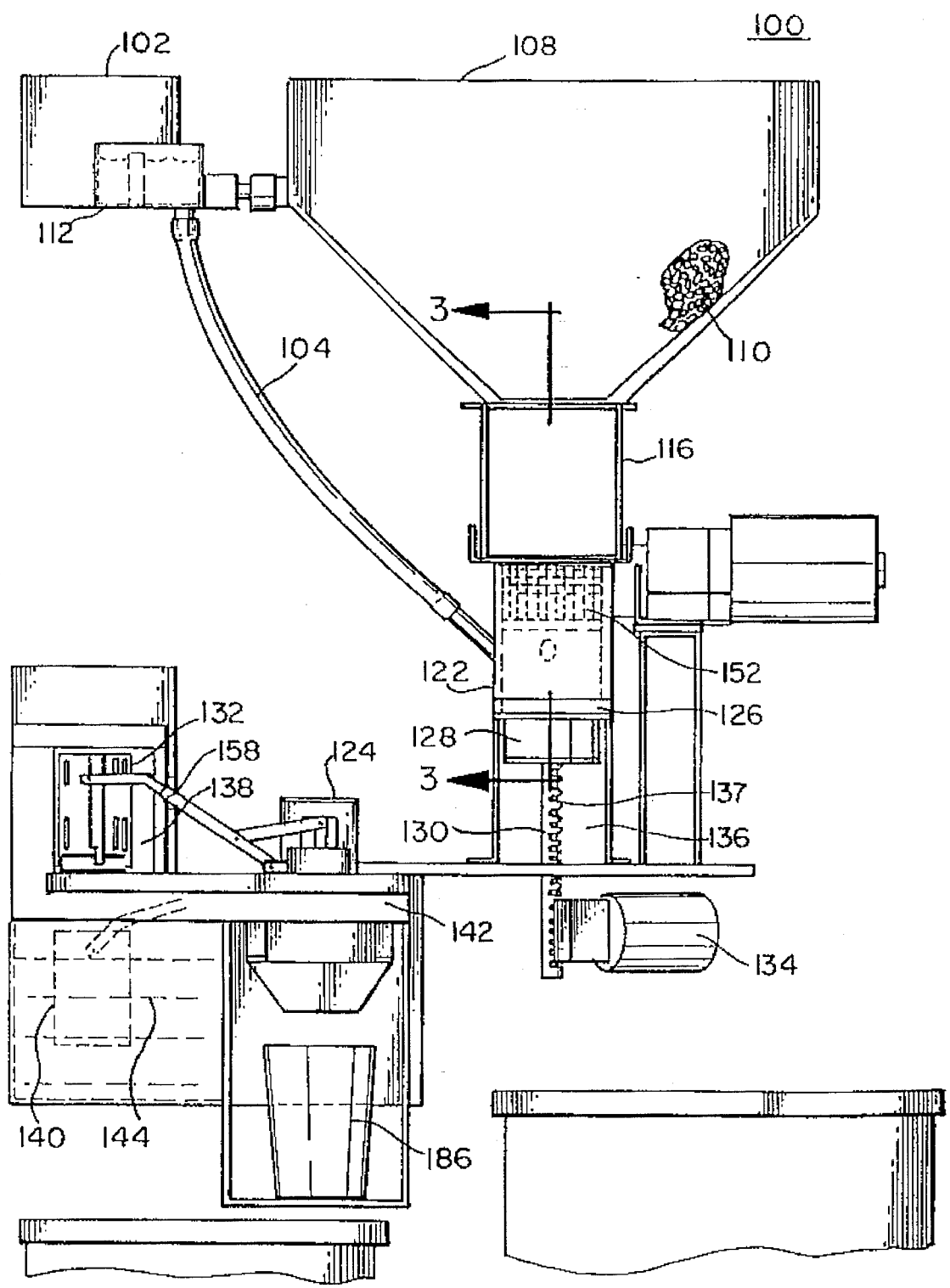
FIG. 2 is a front view of a portion of the interior of the machine for dispensing individually prepared servings of french fries of FIG. 1.

Referring now to FIG. 2, there is shown a front view of a portion of the foodstuff dispensing machine 100. The foodstuff dispensing machine 100 includes a foodstuff processing chamber 122 for receiving dehydrated foodstuff 110 from a dehydrated foodstuff storage hopper 108 and heated water from a water storage container 102. The dehydrated foodstuff 110, in the present embodiment dehydrated potato pellets, is mixed with the heated water in foodstuff processing chamber 122 in order to rehydrate the dehydrated foodstuff 110 received from the dehydrated foodstuff hopper 108.

After the rehydration process within the processing container 122 the resulting foodstuff is formed into its desired shape within the foodstuff dispensing machine 100 by an extrusion process. A foodstuff receiving basket 132 is provided for transporting the extrusion formed foodstuff to different stations within the foodstuff dispensing machine 100. In order to provide the required movement of the foodstuff receiving basket 132, a basket drive motor 124 drives a basket linkage arm 158 coupled to the foodstuff receiving basket 132.

The region of the foodstuff dispensing machine 100 in the vicinity of the foodstuff processing container 122 includes a foodstuff receiving station 136. The foodstuff station 136 is one of three stations at which the foodstuff receiving basket 132 is disposed during a vend cycle of the machine 100. The foodstuff receiving basket 132 is moved by the basket drive motor 124 to the foodstuff receiving station 136 in order to receive the extruded foodstuff after the rehydration process.

After it has received the extruded foodstuff at the foodstuff receiving station 136, the foodstuff receiving basket 132 is moved to a second basket station, the foodstuff cooking station 138. The foodstuff cooking station 138 includes a cooking bath 144. In the cooking bath 144 of the foodstuff cooking station 138 the extruded foodstuff is cooked within the foodstuff dispensing machine 100.

After the extruded foodstuff is cooked at the foodstuff cooking station 138 the basket drive motor 124 moves the foodstuff receiving basket 132, containing the cooked foodstuff, to the third basket station, foodstuff dispensing station 142. The foodstuff dispensing station 142 is located at the front of the foodstuff dispensing machine 100. At the foodstuff dispensing station 142 the cooked foodstuff within the foodstuff receiving basket 132 is transferred from the foodstuff receiving basket 132 to the exterior of the foodstuff dispensing machine 100.

Figure 3:
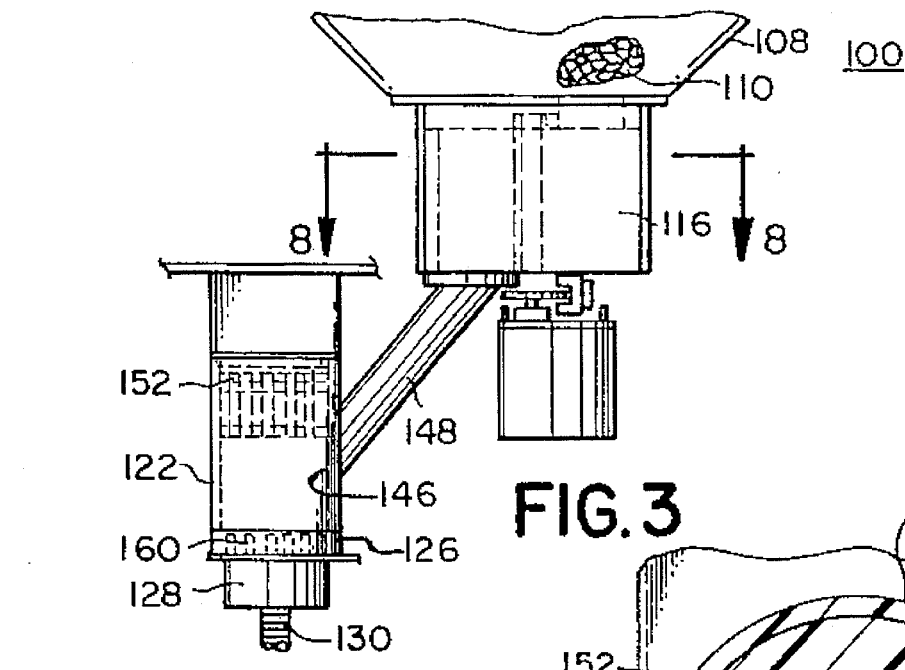
FIG. 3 is a side view of the foodstuff feeding portion of the machine for dispensing individually prepared servings of french fries of FIG. 1.
Figure 9:
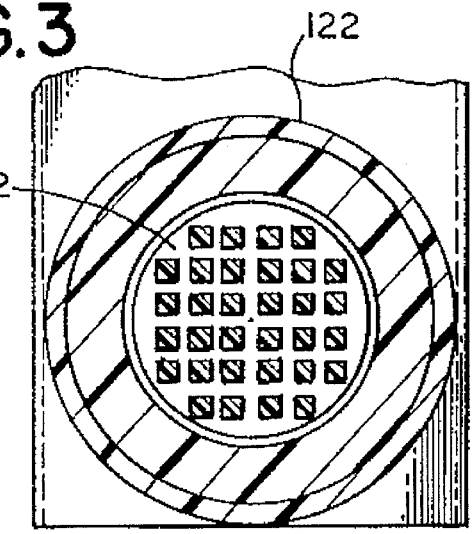
FIG. 9 is a cross-sectional representation of a portion of the machine for dispensing individually prepared servings of french fries of FIG. 2 along line 9—9 of FIG. 4.
Figure 8:
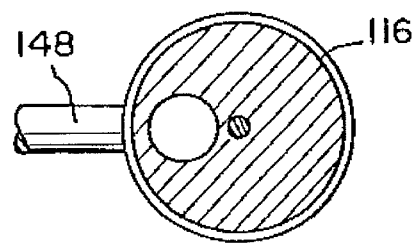
FIG. 8 is a cross-sectional view of a portion of the machine for dispensing individually prepared servings of french fries of FIG. 2 along line 8—8 of FIG. 3.

Referring now to FIG. 3, there is shown a side view of the foodstuff processing container 122 as well as other portions of foodstuff dispensing machine 100 which are used for feeding the dehydrated foodstuff 110 to the foodstuff processing container 122. When a vend cycle of the foodstuff dispensing machine 100 is initiated, a measured amount of the dehydrated foodstuff 110 stored in the dehydrated foodstuff storage hopper 108 is released from the storage hopper 108. The released foodstuff 110 travels under the force of gravity by way of a foodstuff chute 116 to a foodstuff feed line 148. The foodstuff feed line 148 delivers the dehydrated foodstuff 110 from the storage hopper 108 into the processing chamber 122 by way of an opening 146 through a side wall of the processing chamber 122. Thus the foodstuff feed line 148 must communicate directly with the interior of the foodstuff processing chamber 122.

Figure 4:
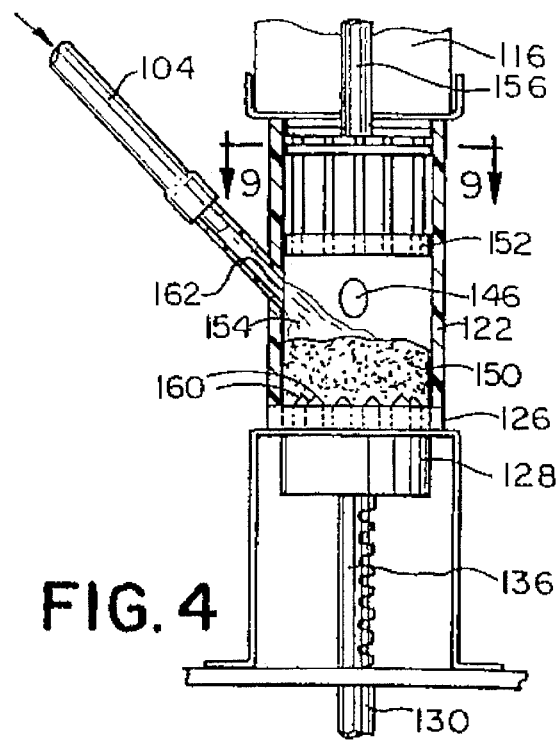
FIG. 4 is a front view of the foodstuff processing container of the machine for dispensing individually prepared servings of french fries of FIG. 1 in its sealed state.

Referring now to FIG. 4, there is shown a more detailed front view of the foodstuff dispensing machine 100 in the vicinity of the foodstuff processing chamber 122. After the dehydrated foodstuff 110 is received into the processing chamber 122, a measured amount of hot water 154 from the water storage container 102 is received by the processing chamber 122 by way of a hot water supply line 104. The amount of water released from the water storage container 102 is controlled by an electrically actuated solenoid 112. The temperature of the hot water 154 entering the foodstuff processing container 122 is preferably about 145°. The temperature is carefully controlled by conventional heating devices as understood by those skilled in the art. It will be understood that the temperature of the hot water 154 is raised to the preferred rehydration temperature prior to its arrival in the processing chamber 122. The hot water 154 and the dehydrated foodstuff 110 are combined in this manner within the foodstuff processing chamber 122 to provide a rehydration foodstuff mixture 150 having a mash-like consistency.

In order to assist in providing finished servings of dispensed foodstuff as quickly as possible within the foodstuff dispensing machine 100, various methods of accelerating the rehydration process may be used. For example, the hot water 154 applied to the processing chamber 122 by way of the hot water supply line 104 may be at least 145°. The flow of the hot water 154 is accelerated by gravity as it travels from the water container 102 through the hot water supply line 104. The high temperature and the velocity of the hot water 154 act to shock the dehydrated foodstuff 110 disposed within the processing chamber 122 when the hot water 154 and the foodstuff come into contact. This causes the dehydrated foodstuff 110 to immediately absorb hot water 154 and swell up, thereby rehydrating the dehydrated foodstuff 110 very quickly.

Figure 5:
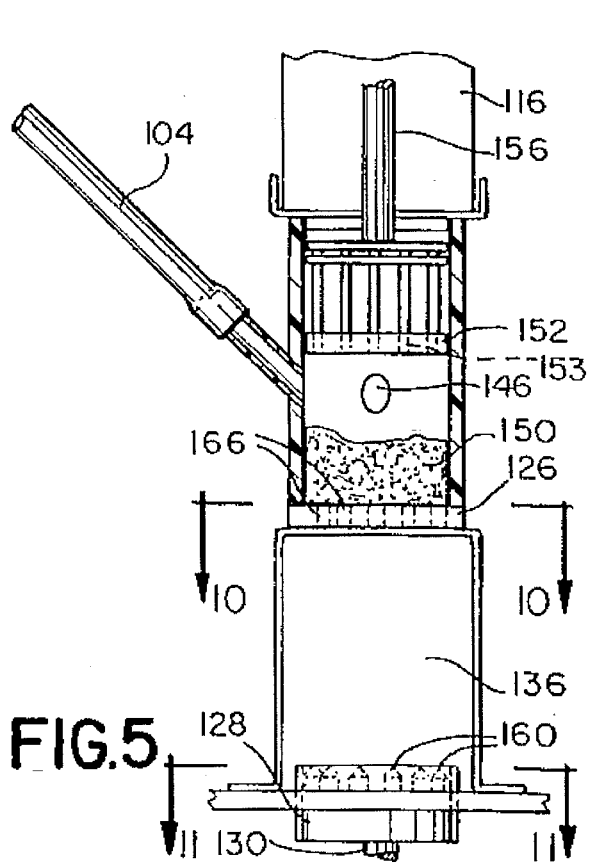
FIG. 5 is a front view of the foodstuff processing container region of the machine for dispensing individually prepared servings of french fries of FIG. 1 in its unsealed state.

Referring now to FIG. 5, there is shown a front view of the foodstuff dispensing machine 100 in the vicinity of the foodstuff processing container 122 in its unsealed position. The bottom surface of the foodstuff processing chamber 122 is formed by a foodstuff extruding die 126 having a number of spaced apart extrusion die openings 166. When the dehydrated foodstuff 110 and the hot water 154 are initially received and combined within the foodstuff processing container 122, all of the extrusion die openings 166 are sealed by suitably sized die sealing fingers 160 disposed on the top surface of a die sealing piston 128.

In the preferred embodiment the foodstuff dispensing machine 100 uses the following 2.7 oz. of water heated to 145° F. and 1.3 oz. of potato product. The potato pellets are made from pure potatoes, dehydrated, freeze-dried then pelletized. Pellets are approximately 0.312 long and 0.125 wide and 0.125 high. It will be understood that these values may be varied by those skilled in the art.

The die sealing fingers 160 disposed upon the die sealing piston 128 are preferably formed of a polymeric material and are snugly received and tightly held within the extrusion die openings 166. This tightly sealing fit prevents leakage of the hot water 154 or the dehydrated foodstuff 110 received into the foodstuff processing container 122 during the rehydration process.

However, after the combining of the dehydrated foodstuff 110 and the hot water 154 to form the rehydrated foodstuff 150, the sealing fingers 160 are moved downwardly away from the die openings 166 in the extrusion die 126 which forms the bottom of the foodstuff processing container 122. Removal of the sealing fingers 160 from the openings 166 causes the extrusion die 126 to form an extrusion surface on the bottom of the foodstuff processing container 122. The die sealing fingers are removed from the openings 166 in this manner by a die sealing piston shaft 130. The die sealing shaft 130 includes rack teeth 137 and is driven by a pinion (not shown) on a sealing piston motor 134 (FIG. 2) within the foodstuff dispensing machine 100.

Figure 10:
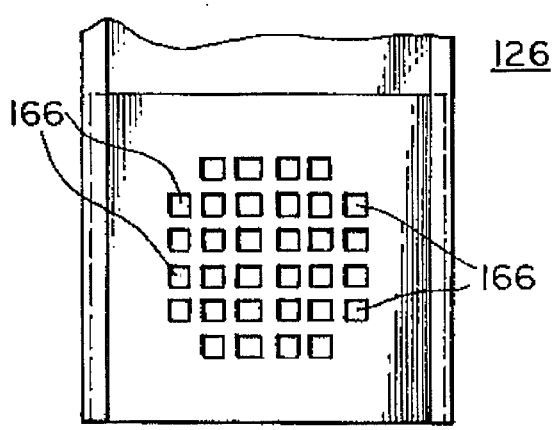
FIG. 10 is a plan view of the extruding die of the foodstuff processing chamber of FIG. 2 along line 10—10 of FIG. 5.
Figure 11:
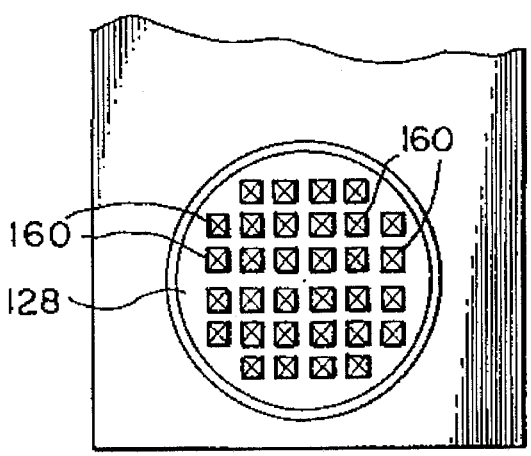
FIG. 11 is a top view of the die sealing piston of the foodstuff processing container of FIG. 2 along line 11—11 of FIG. 5.

Referring now to FIGS. 10, 11, there are shown cross sectional views of the region of the foodstuff dispensing machine 100 in the vicinity of the foodstuff processing container 122. These views include a view of the extrusion die 126 which forms the bottom of the processing container 122 and a view of the die sealing fingers 160 which seal the die openings 166 of the extrusion die 126.

In the preferred embodiment of the foodstuff dispensing machine 100 the foodstuff extrusion die 126 for forming the bottom of the processing container 122 has thirty-two spaced apart extruding die openings 166. The thirty-two die openings 166 are best seen in FIG. 10. In the preferred embodiment of the foodstuff dispensing machine 100 the die sealing piston 128 has thirty-two die sealing fingers 160 disposed on its top surface. The arrangement of the die sealing fingers 160 are best seen in FIG. 11. Each of the die sealing fingers 160 is aligned with and seals a corresponding die opening 166.

The die sealing fingers 160 are moved into engagement with the extrusion die 126, and tightly received by the extrusion die openings 166, as the die sealing piston 128 is moved upwardly toward the foodstuff processing chamber 122 thereby sealing the bottom surface of the processing chamber 122. As previously described, the die sealing fingers 160 are moved downwardly away from the foodstuff extrusion die 126 by means of the die sealing piston shaft 130 to unseal the processing container 122 and permit extrusion of the rehydrated foodstuff mixture 150.

Figure 6:
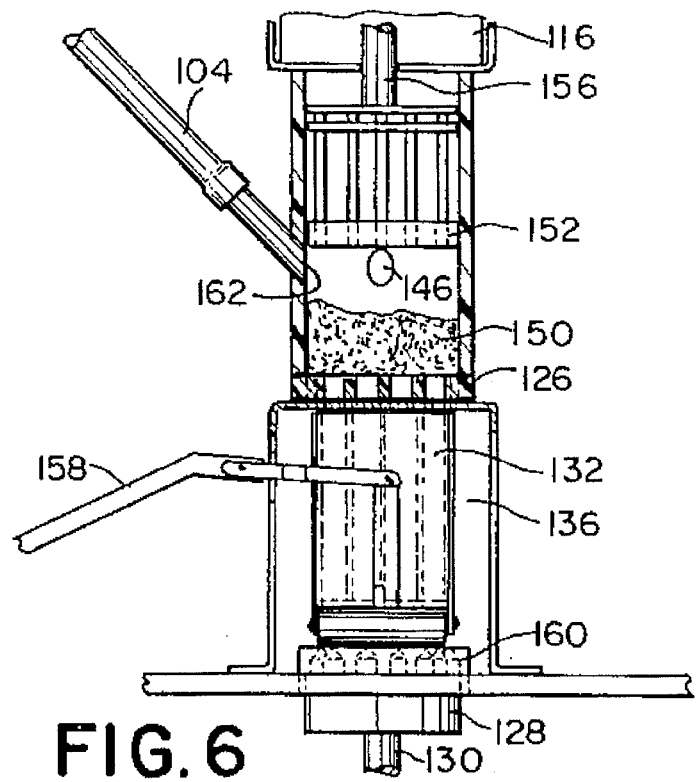
FIG. 6 is a front view of the foodstuff processing container region of the machine for dispensing individually prepared servings of french fries of FIG. 1 with the foodstuff receiving basket disposed in the receiving station.
Figure 7:
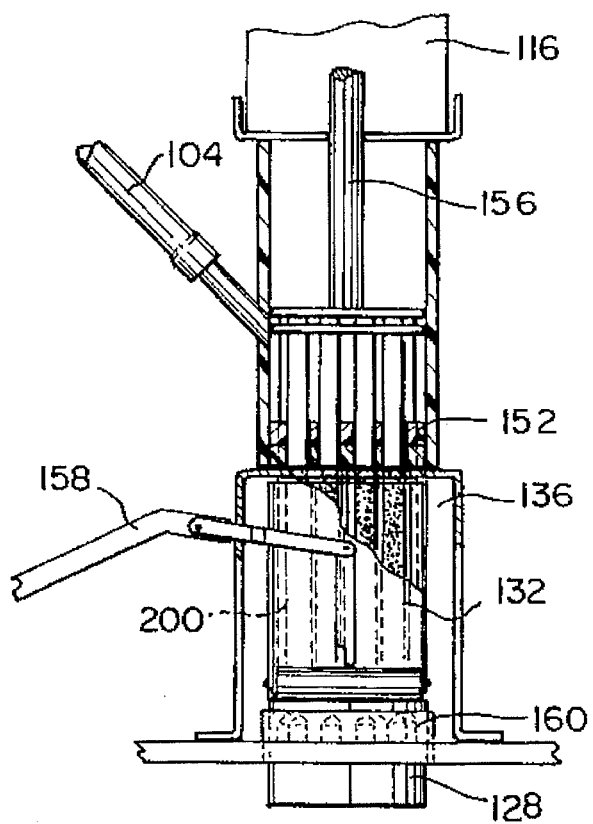
FIG. 7 is a front view of the foodstuff processing container region of the machine for dispensing individually prepared servings of french fries of FIG. 1 with the receiving basket disposed in the receiving station.

Referring now to FIG. 6, there is shown a further front view of the foodstuff processing container 122 in its unsealed state. After the sealing fingers 160 are withdrawn from the die openings 166 of the extrusion die 126 at the bottom of the bottom of the foodstuff receiving container 122, the receiving basket 132 is moved into the foodstuff receiving station 136. Within the foodstuff receiving station 136 the receiving basket is disposed beneath the foodstuff processing chamber 122 and above the die sealing fingers 160. The foodstuff receiving basket 132 is disposed in this manner within the foodstuff receiving station 136 using the linkage arm 158. When the foodstuff receiving basket 132 is in the receiving position beneath the extrusion die 126, the extruding die 126 provides a common foodstuff forming surface between the foodstuff processing container 122 and the foodstuff receiving basket 132.

When the foodstuff receiving basket 132 is in the receiving position within the foodstuff receiving station 136, a pressure applicator disk 152 begins downward movement within the processing container 122. The pressure applicator disk 152 is driven by a pressure applicator shaft 156. The pressure applicator disk 152 moves downwardly past the opening 162 through the wall of the processing container 122 for receiving the hot water supply line 104 prior to making contact with the foodstuff rehydration mixture 150. The pressure disk 152 also moves past the opening 146 for the foodstuff feed line 148 prior to making contact with the foodstuff rehydration mixture 150. During this downward movement the pressure applicator disk 152 tightly engages the inner circumference of the foodstuff receiving chamber 122 around its entire circumference. Therefore, leakage of the rehydrated foodstuff mixture 150 through the opening 146 or opening 162 of the processing container 122 is prevented during the pressure application process.

As the pressure applicator shaft 156 continues to drive the pressure applicator disk 152 downward, increasing pressure is applied to the rehydrated foodstuff mixture 150 within the processing container 122. It is believed that the pressure applied to the rehydration mixture 150 during the rehydration process further facilitates the rehydration of any dry foodstuff 110 which may remain. It is believed that the pressure assists in the rehydration process by forcing the hot water 150 more quickly and more completely into contact with the remaining dehydrated foodstuff 110 within the processing container 122.

Additionally, due to the high temperature of the hot water 154 transmitted to the processing chamber 122 prior to the application of pressure, the rehydrating foodstuff mixture 150 is still hot when the pressure is applied. Therefore, the processing within the processing chamber 122 includes both heat assisted rehydration and, simultaneously, pressure assisted rehydration of the dehydrated foodstuff 110 which is fed into the foodstuff processing chamber 122 from the dehydrated foodstuff hopper 108. When enough time has elapsed and enough pressure is applied to the rehydrated foodstuff mixture 150 by the pressure applicator 152, the rehydration process is completed. Extrusion of the rehydrated foodstuff mixture 150 through the extrusion die openings 166 of the extrusion die 126 which forms the bottom of the foodstuff processing chamber 122 may then begin.

Figure 13:
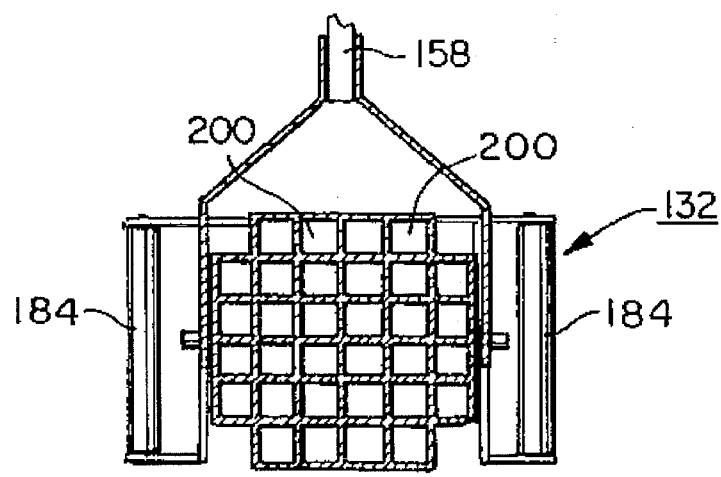
FIG. 13 is a cross-sectional representation of the receiving basket of the machine for dispensing individually prepared servings of french fries of FIG. 1.

Referring now to FIG. 13, there is shown a top view of the foodstuff receiving basket 132. The foodstuff receiving basket 132 receives rehydrated foodstuff 150 extruded through the extrusion die plate 126 when it is disposed at the foodstuff receiving basket station 136. The extruded foodstuff 150 is then transported from the foodstuff receiving basket station 136 to the basket stations 138, 142 within the foodstuff dispensing machine 100 of the present invention.

The foodstuff receiving basket 132 is divided into 32 individual foodstuff receiving chambers 200. In the preferred embodiment of the foodstuff dispensing machine 100, the number and positions of the foodstuff receiving chambers 200 correspond to the number and positions of the extrusion die openings 166 through the foodstuff die plate 126 located at the bottom of the foodstuff processing chamber 122. When the foodstuff receiving basket 132 is disposed within the foodstuff receiving station 136 by the linkage arm 158, the basket 132 is positioned such that an individual chamber 200 of the foodstuff receiving 132 is disposed directly below each one of the extruding die openings 166.

As the pressure applicator disk 152 continues its downward movement it forces the rehydrated foodstuff mixture 150 through openings 166 of the extrusion die 126 at the bottom of the foodstuff processing chamber 122. Individual formed elongated pieces of the rehydrated foodstuff mixture 150 are formed by extrusion through each of the individual extrusion die openings 166. The individual pieces of extruded foodstuff mixture 150 formed by each of the extruding die openings 166 have a cross section which corresponds to the size of the die openings 166. The extruded foodstuff pieces are received by corresponding individual foodstuff receiving chambers 200 within the receiving basket 132.

In the preferred embodiment of the foodstuff dispensing machine 100 thirty-two extrusion die openings 166 are provided through the foodstuff die plate 126 as previously described. Each opening 166 is generally square having side dimensions of about 0.25 inches square. Thus, when the pressure applicator disk 152 forces the rehydrated foodstuff mixture 150 through the foodstuff extrusion die 126, thirty-two individual elongated pieces of formed foodstuff are extruded. In the preferred embodiment of the food dispensing machine 100, the dehydrated foodstuff 110 is dehydrated potato material and each of the thirty-two pieces of extruded foodstuff yields an individual french fry after cooking. Individual polymer coated die cleaning fingers 153 extend downwardly from the pressure applicator 152. Die cleaning fingers tightly fit into the die openings 166 and clean the die openings 166 as the pressure applicator 152 finishes its downward movement.

After extrusion of the rehydrated foodstuff mixture 150 is complete, the foodstuff receiving basket 132 is withdrawn from the foodstuff receiving station 136. When the foodstuff receiving basket 132 is no longer disposed in the foodstuff receiving station 136 between the die sealing piston 128 and the foodstuff extruding die 126 beneath foodstuff processing chamber 122, the piston sealing motor 134 is activated. The piston sealing motor 134 drives the die sealing piston shaft 130 and the die sealing piston 128 upward. When the die sealing piston 128 reaches the end of its upward travel, the die sealing fingers 160 are matingly received by the foodstuff extruding die 126. Furthermore, the upper ends of the die sealing fingers 160 extend partially beyond the top inside surface of the die plate 126.

Because the die cleaning fingers 153 are very smoothly and tightly received by the extruding die openings 166, the die cleaning fingers 153 push substantially all of the rehydrated foodstuff 150 from within the extruding die openings 166 as they travel downward. It will be understood by those skilled in the art that the surfaces of both the die cleaning fingers and the die sealing fingers 160, as well as the inner surfaces of the extrusion die openings 166, may be formed of a smooth material, such as teflon. Smooth surfaces are provided to facilitate the cleaning action. It will be also understood, however, that forming the surfaces with a material such as teflon also assists in preventing sticking of materials to the surfaces and assists in movement of the tightly received sealing fingers 160 through the die plate openings 166.

After the foodstuff receiving basket 132 is withdrawn from the foodstuff receiving station 136 by the basket drive motor 124, the receiving basket 136 is moved to the foodstuff cooking station 138 of the dispensing machine 100. Within the foodstuff cooking station 138, a foodstuff cooking chamber 144 is provided. The cooking station 138 may include a bath of hot cooking oil which is maintained in a ready state at a high temperature at all times in order to permit immediate cooking of the extruded foodstuff within the receiving basket 132.

The linkage arm 158 for moving the receiving basket 132 may be hinged to facilitate downward movement of the receiving basket 132 to a cooking position 140 within the cooking chamber 144. The receiving basket 132 is maintained in the cooking position 140 for a predetermined amount of time in accordance with such factors as the size and type of the foodstuff to be cooked and the temperature of the cooking oil within the cooking chamber 144. When the predetermined amount of cooking time has elapsed the receiving basket 132 is raised from the cooking position 140 within the cooking chamber 144 by the arm 158.

The receiving basket 132 may be maintained above the cooking chamber 144 for a period of time in order to permit oil to drip from the basket 132 and the foodstuff contained within the basket 132. Thus the oil can drip directly into the cooking chamber 144. Alternately, the receiving basket 132 may be immediately withdrawn from the foodstuff cooking station 138 along a predetermined path by the arm 158. In this embodiment an oil catching channel (not shown) may be provided along the predetermined path for receiving oil which drips from the receiving basket 132 and from the foodstuff within the receiving basket 132 while they are transported from the cooking station 138.

In one embodiment of the foodstuff dispensing machine 100 an air knife (not shown) may be provided in the region of the foodstuff cooking station 138. The air knife may have approximately eighteen small holes of approximately 0.031 in diameter. The holes may be arranged in a row facing the bottom of the basket 132. When the basket 132 has been lifted from the oil it is allowed to drip for seven seconds. When the basket 132 begins moving toward the dispensing area 142 the air-knife releases a blast of air to blow the remaining oil off the basket 132 and into the cooking bath 144. For this purpose the air knife may be powered by a small air compressor. Each time the basket 132 exits the cooking bath 144 the air knife fires.

Figure 12:
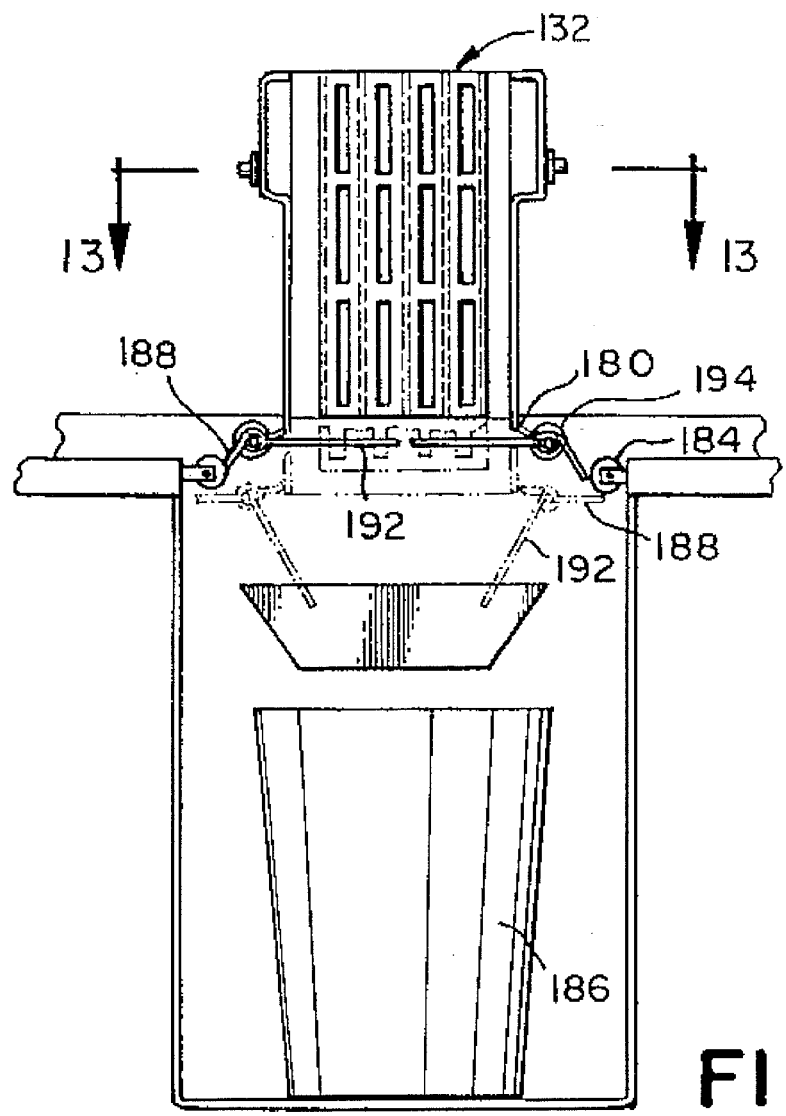
FIG. 12 is a front view of the dispensing station of the machine for dispensing individually prepared servings of french fries of FIG. 1.

Referring now to FIG. 12, there is shown a front view of the foodstuff receiving basket 132 in its foodstuff dispensing position at the foodstuff dispensing station 142 of the foodstuff dispensing machine 100. In the preferred embodiment of the foodstuff dispensing machine 100, the foodstuff receiving basket 132 is provided with a moveable bottom surface for permitting the dispensing of cooked foodstuff contained therein. In this embodiment the moveable bottom surface may be moved from underneath the cooked foodstuff within the receiving basket 132 where it supports the cooked foodstuff. Movement of the bottom surface of the basket 132 in this manner permits the cooked foodstuff to move under the influence of gravity from the foodstuff receiving basket 132. Foodstuff released in this manner falls into a dispensing cup 186.

A cup dispenser (not shown) may be disposed within the foodstuff dispensing machine 100 in the region above the foodstuff dispensing area 142. Alternately the cup dispenser may be disposed to one side of the machine 100. In this case, the cup dispenser may drop the cup onto a conveyor belt (not shown). The foodstuff is then dropped into the cup and a new cycle may take place. In the new cycle a motor driven piston, with thirty-two elongated fingers may be lowered through the portions of the basket 142 to strip any fries which were not released in the drop of fries into the dispensing cup. This feature removes any fries which may remain in the basket after dispensing.

The foodstuff receiving basket 132 may be provided with pivoting doors 192 on its bottom surface for holding the cooked foodstuff within the receiving basket 132. When the pivoting doors 192 are pivoted on pivots 194 away from the bottom of the receiving basket 132 the foodstuff therein is permitted to fall into the dispensing cup 186. The pivoting doors 192 may be held in a closed position against the bottom of the receiving basket 132 by counterweights 184 applied to the pivots 194. The downward force of the counterweights 184 provides an upward closing force on the pivoting doors 192 by way of the pivots 194 thereby forcing the doors 192 against the bottom of the receiving basket 132. Additionally, biasing devices, such as biasing springs 180, may be applied to the pivots 194 to resiliently bias the pivoting doors 192 into their closed position.

The foodstuff dispensing station 142 is provided with door opening lugs 188. The door opening lugs 188 pivot the pivoting doors 192 and open the bottom of the receiving basket 132 to permit the cooked foodstuff to fall from the receiving basket 132. As the receiving basket 132 is lowered into its dispensing position within the dispensing station 142, each of the counterweights 184 of the pivoting doors 192 encounters a door opening lug 188. As downward motion of the foodstuff receiving basket 132 continues, the counterweights 188 are prevented from traveling downward any farther by the door opening lugs 188. The stopping of the counterweights 188 causes the doors 192 to pivot about pivots 194. The opening lugs 188 thus force the doors 192 to pivot open against the biasing forces of the biasing springs 180.

It will be understood that the foodstuff dispensing machine 100 of the present invention is adapted to receive payment from a user and provide an individual serving of french fries very quickly. Thus, each of the steps described hereinabove may be executed in a predetermined period of time by a system controller described hereinbelow. Examples of these time periods in the preferred embodiment of the foodstuff dispensing machine 100 are set forth in Table 1.

TABLE I

| FUNCTION | SECONDS |
| --- | --- |
| Accept Payment | 0 |
| Drop Foodstuff 110 | 2.0 |
| Drop Water 154 | 3.0 |
| Soak Time | 10.0 |
| Lower Piston 128 | 10.0 |
| Lift Basket 132 | 1.5 |
| Drip Cycle | 5.0 |
| Rotate Basket 132 | 3.5 |
| Press Foodstuff 150 | 1.5 |
| Rotate basket 132 to bath 144 | 3.5 |
| Lower basket 132 into bath 144 | 1.5 |
| Cook | 45.0 |
| Lift basket 132 from bath 144 | 1.5 |
| Drip Cycle | 4.0 |
| Move to Dispense Station 142 | 1.7 |
| Dispense | 1.5 |

The process flow of the food stuff dispensing machine 100 of the present invention may be understood by those skilled in the art from Table I. In accordance with Table I, after payment has been accepted instructions are provided by a system controller (described hereinbelow) within the foodstuff dispensing machine 100 to drop the foodstuff 110. The programming of the system controller for this purpose is well understood by those skilled in the art and the devices required to drop the foodstuff under the control of the system controller are conventional. After the amount of time indicated in Table I, water 154 is dropped in accordance with Table I under the control of the system controller. The programming and devices required for the water drop are also well within the skill of the average practitioner. The process flow of the remaining operations controlled by the system controller and required for foodstuff dispensing machine are set forth in a similar manner in the remainder of Table I.

Figure 14:
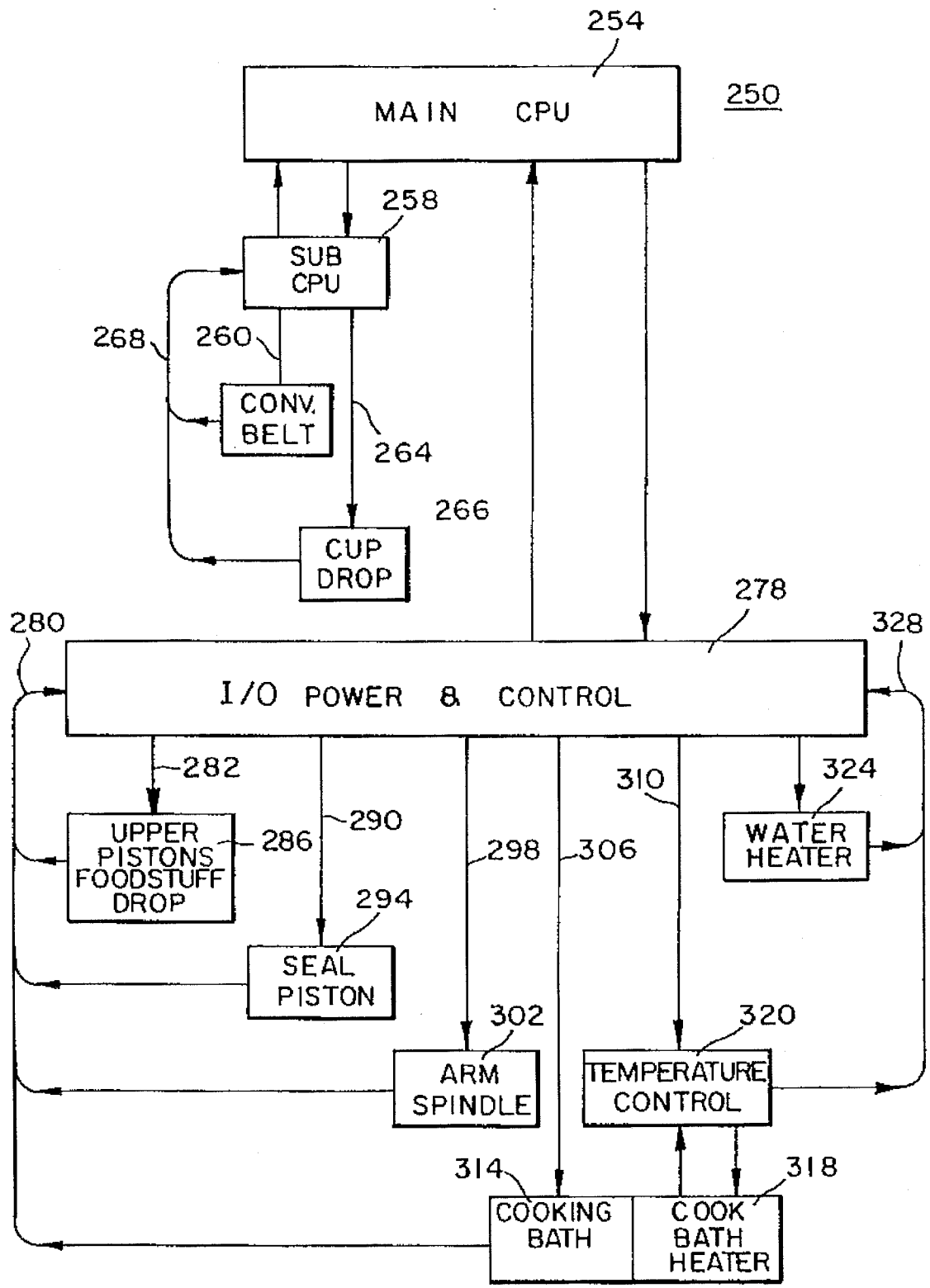
FIG. 14 is a block diagram representation of a system controller for controlling the operations of the machine for dispensing individually prepared servings of french fries in accordance with the present invention.

Referring to FIG. 14, there is shown the system controller 250 for controlling the operations of the foodstuff dispensing machine 100 in accordance with the present invention as set forth in the process flow of Table I. The system controller 250 includes a main CPU 254 and an input/output power and control block 278 which operates under the control of the main CPU 254. A subordinate CPU 258 also operates under the control of the main CPU 254. The subordinate CPU 258 controls the conveyor belt 262 by way of the control line 260 if one is provided within the machine 100. A cup drop 266 is also controlled by the subordinate CPU 258, by way of the control line 264. The operation of the conveyor belt 262 and the cup drop 266 are monitored by the subordinate CPU 258 by way of the feedback sensing line 268.

The upper pistons and the dropping of foodstuff are controlled by the main CPU 254 by way of the power and control block 278 and the control line 282. In a similar manner the seal piston is controlled by the main CPU 254 by way of the control line 290 as shown in block 294. The movement of the basket-moving arm is controlled by way of the power and control block 278 and the control line 298 as shown in block 302. The main CPU 254 monitors these devices by way of feedback sensing line 280 and the power and control block 278. The main CPU 254 also controls the cooking bath 144 by way of the control line 306 as shown in block 314, and a temperature control block 320 by way of a control line 310. The temperature control block 320 controls the heater of the cooking bath 144 as shown in block 318. The water heater is also controlled by the system controller 250 as shown in block 324. Feedback from the water heater of block 324 and the temperature control block 320 is applied to the main CPU 254 by way of the feedback sensing line 328.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A foodstuff vending machine having a vending machine housing, comprising:

a processing container for containing and processing a foodstuff;

a receiving basket for receiving said foodstuff from said processing container;

a dispensing mechanism for dispensing said received foodstuff;

said receiving basket having an operable surface with a closed position for preventing said received foodstuff from passing therethrough and an open position for permitting said received foodstuff to pass therethrough to said dispensing mechanism, and an upper surface of said receiving basket being formed by an extruding die having a plurality of spaced apart die openings for forming said foodstuff into a plurality of french fries; and an opening device coupled to said receiving basket for opening said operable surface, said opening device operable to open said operable surface upon contact with said dispensing mechanism.

2. The foodstuff vending machine of claim 1, further including biasing means for biasing said operable surface toward said closed position.

3. The foodstuff vending machine of claim 2, wherein said biasing means comprises a counterweight which pivotally urges the operable surface into said closed position.

4. The foodstuff vending machine of claim 3, wherein said dispensing mechanism comprises a lug for contacting and supporting said counterweight when said received foodstuff is transferred to said dispensing mechanism in order to open said operable surface.

5. The foodstuff vending machine of claim 2, wherein said operable surface is resiliently urged into said closed position.

6. The foodstuff vending machine of claim 1, wherein said operable surface is pivotally operable.

7. The foodstuff vending machine of claim 1, wherein said extruding die forms the bottom surface of said processing container.

8. The foodstuff vending machine of claim 7, further comprising a foodstuff storage hopper for storing dehydrated foodstuff and a water container for storing water wherein a predetermined quantity of dehydrated foodstuff from said storage hopper and a predetermined quantity of water from said water container are transferred to said processing container for mixing and rehydration of said dehydrated foodstuff therein in response to activation of said foodstuff vending machine.

9. The foodstuff vending machine of claim 8, wherein said predetermined quantity of dehydrated foodstuff and water are metered as they are transferred to said processing container.

10. The foodstuff vending machine of claim 8, further comprising a pressure applicator for applying pressure to said mixed dehydrated foodstuff and water in order to provide pressure assisted rehydration of said dehydrated foodstuff.

11. The foodstuff vending machine of claim 10, wherein said water is heated to a predetermined temperature prior to being mixed with said dehydrated foodstuff to provide heat assisted rehydration.

12. The foodstuff vending machine of claim 10, wherein said pressure applicator forces said rehydrated foodstuff from said processing container into said receiving basket through said die openings of said extruding die to form said plurality of french fries.

13. The foodstuff vending machine of claim 12, wherein said pressure applicator comprises a piston and said processing container comprises a cylinder, said piston for engaging an inner surface of said processing container and advancing through said processing container to force said rehydrated foodstuff through said die openings.

14. The foodstuff vending machine of claim 1, wherein said receiving basket is divided into a plurality of receiving basket partitions for receiving individually formed portions of said foodstuff.

15. The foodstuff vending machine of claim 14, wherein said receiving basket further comprises a plurality of foodstuff forming die openings in one surface thereof wherein each of said receiving basket partitions receives a single formed portion of said foodstuff through a single one of said die openings.

16. The foodstuff vending machine of claim 1, further comprising a plurality of spaced apart die mating fingers for individually mating with and tightly fitting within said plurality of spaced apart die openings to removably seal said die openings during said processing of said foodstuff.

17. The foodstuff vending machine of claim 16, further comprising means for removing said fingers from said die openings to permit said foodstuff to pass from said processing container through said die openings to said receiving basket.

18. The foodstuff vending machine of claim 1, wherein said operable surface of said receiving basket is the bottom surface of said receiving basket and said foodstuff falls through said operable surface due to the force of gravity when said operable surface is in said open position.

19. The foodstuff vending machine of claim 18, further comprising a serving container and directing means for directing said foodstuff falling through said operable surface to said serving container.

20. The foodstuff vending machine of claim 1, wherein said dispensing mechanism dispenses said received foodstuff to the exterior of said housing.

21. The foodstuff vending machine of claim 1, further comprising a cooking chamber within said vending machine housing for frying said received foodstuff.

22. The foodstuff vending machine of claim 21, further comprising means for transporting said received foodstuff within said receiving basket to said cooking chamber for frying of said foodstuff.

23. The foodstuff vending machine of claim 22, further comprising a system controller for controlling said cooking chamber and said transporting.

24. A foodstuff vending machine having a vending machine housing, comprising:

a processing container for containing and processing a foodstuff;

a receiving basket for receiving said foodstuff from said processing container;

a dispensing mechanism for dispensing said received foodstuff;

said receiving basket having an operable surface with a closed position for preventing said received foodstuff from passing therethrough and an open position for permitting said received foodstuff to pass therethrough to said dispensing mechanism;

said receiving basket being divided into a plurality of receiving basket partitions for receiving individually formed portions of said foodstuff; and an opening device coupled to said receiving basket for opening said operable surface, said opening device operable to open said operable surface upon contact with said dispensing mechanism.

25. A foodstuff vending machine having a vending machine housing, comprising:

a processing container for containing and processing a foodstuff;

a receiving basket for receiving said foodstuff from said processing container;

a dispensing mechanism for dispensing said received foodstuff;

said receiving basket having an operable surface with a closed position for preventing said received foodstuff from passing therethrough and an open position for permitting said received foodstuff to pass therethrough to said dispensing mechanism;

biasing means for biasing said operable surface toward said closed position, the biasing means comprising a counterweight which pivotally urges the operable surface into said closed position; and an opening device coupled to said receiving basket for opening said operable surface, said opening device operable to open said operable surface upon contact with said dispensing mechanism.

\* \* \* \* \*